United States Patent [19]

Shelton

[11] Patent Number: 5,494,690
[45] Date of Patent: * Feb. 27, 1996

[54] METHOD AND APPARATUS FOR CONTROLLING PREPARATION OF FOOD IN AN OVEN

[76] Inventor: Winston Shelton, P.O. Box 99222 Chenoweth Run Rd., Louisville, Ky. 40299

[*] Notice: The portion of the term of this patent subsequent to Sep. 19, 2011, has been disclaimed.

[21] Appl. No.: 851,666

[22] Filed: Mar. 16, 1992

[51] Int. Cl.⁶ ............................. A23L 1/00; G05D 23/00
[52] U.S. Cl. ............................. 426/233; 99/331; 99/474; 99/483; 426/506; 426/520
[58] Field of Search .................................. 426/233, 506, 426/520, 418; 99/483, 331, 474, 421 TP; 165/3

[56] References Cited

U.S. PATENT DOCUMENTS

| | | | |
|---|---|---|---|
| 4,210,675 | 7/1980 | Liebermann | 426/233 |
| 4,244,979 | 1/1981 | Roderick | 99/474 |
| 4,770,888 | 9/1988 | Loeb | 426/520 |

*Primary Examiner*—George Yeung

[57] ABSTRACT

Method and apparatus for controlling the preparation of food product in an oven which includes a food preparation chamber. A first heat source is provided to heat the air in the chamber and a second heater is located in a water reservoir to establish the water vapor content in the chamber. The temperature of the air in the chamber and the temperature of the water in the reservoir are selected to maintain conditions in the chamber in selected relation with the equilibrium characteristics of the food product in preparation in the chamber. Different process steps and procedures can be provided in memory in the apparatus and selectively recalled for preparing food and the conditions in the chamber can be adjusted during a cooking cycle to produce a food product with desired characteristics.

8 Claims, 5 Drawing Sheets

5,494,690

METHOD AND APPARATUS FOR CONTROLLING PREPARATION OF FOOD IN AN OVEN

BACKGROUND OF THE INVENTION

The present invention relates generally to processes, procedures and equipment for the preparation of food product as well as the storage and handling of food product after it has been prepared.

Numerous preparation devices and procedures are known to be useful in the preparation of foods including several types of ovens and similar equipment.

For example, such food processing equipment includes dry ovens which are commonly known and in wide use. Dry ovens generally have a chamber which is heated by various means and is provided with control means to maintain the temperature in the chamber within selected limits.

In the use of dry ovens it is not generally recognized that processing food in dry ovens causes water vapor to continually enter and leave the food in preparation. Furthermore, no prior art procedure is known which recognizes that there is an equilibrium water activity specific to each food where water vapor enters and leaves the food product at the same rate so that there is no overall loss or gain of water content in the food product. Most foods in general have equilibrium water activities in the range of 0.2 to 1.0.

Specifically, prior art processes and apparatus have not recognized the benefits achieved from the use of equilibrium water characteristics of food products in the preparation of the food.

In addition to dry ovens, the prior art includes other equipment such as steamers where the cooking chamber is from time to time saturated with water vapor; but again without recognition of the equilibrium water activity of the food product in preparation.

Some prior art procedures and apparatus have attempted to combine the effects of the dry oven and steamers by periodical injection of water vapor into the food processing chamber. In general, such prior art apparatus and procedures have maintained the air temperature in the chamber at selected levels and injected water vapor as water or steam to maintain moisture content in the enclosure, again without consideration of the equilibrium water activity of the food being processed. Again, the prior art does not recognize the unexpected benefits of adjusting moisture characteristics in the oven in relation to the equilibrium water activity of the food being processed to effect desired results in the food product. Further, the moisture and temperature characteristics may be selectively adjusted during the processing of the food product to achieve desired final characteristics of the food product.

In this regard no prior art apparatus or procedure is known where water is introduced to the chamber by any method so that the moisture content is maintained in relation to the equilibrium water activity of the food product and further where the vapor content of the air in the chamber can be adjusted relative to the equilibrium water activity of the food being processed to achieve desired final characteristics of the food product.

In fact, in many prior art arrangements, the expansion realized by injection of water vapor causes the vapor to condense. Since the food product usually presents the coolest surface area in the chamber the vapor condenses on the food and undesirably wets the surface of the food. As a result, the quality of food prepared in such devices suffers unless a great deal of attention is devoted to the operation of the device.

Further with respect to "dry" ovens, the loss of water content which occurs in preparation of some foods leads to the general conclusion that food prepared in a dry oven is ". . . dry, hard, tough, tasteless, . . . stale . . . . " Additionally, some foods prepared in a dry oven are likely to evidence shrinkage because of the moisture loss during processing. It is such loss of moisture which also leads to shrinkage of the food and deterioration of appearance.

It is recognized that in the preparation of foods in a dry oven there may be a very narrow time window during which the food is cooked to the desired degree and characteristics. If the food is not removed from the oven at this time deterioration of the food begins. As a result the watchful care of a skilled chef is generally necessary to achive the best results. Even then it is not possible to maintain the food product in the oven past the optimum time without deterioration of the food.

Additionally, dry ovens are inherently not energy efficient.

Specifically, the operating cost of dry ovens is increased because of the excess heat needed to compensate for the substantial loss of moisture from the food in preparation. In operation of dry ovens, heat is transferred to the food principally by convective heat transfer to the air in the chamber followed by convective heat transfer from the air to the food. Since the air in a dry oven is generally dry, and the specific heat of dry air is lower than the specific heat of moist air, then the rate of heat transfer from the air to the food is lower for dry air and preparation times are correspondingly extended. Also because of the lower specific heat of dry air, the temperature of the heat transfer surfaces used to transfer heat to the air must be increased. Because of the increased temperature required and the extended time required for processing the food, additional energy is required over that which would be used if the moisture content of the air were increased.

Processing time and energy loss is further extended by the energy required for the unnecessary evaporation of water from the food being processed. This evaporation process also extends the processing time required for preparation of the food.

Another problem commonly encountered with conventional ovens is air leakage from the oven, usually through the door gasket. In dry ovens the quality and time of food preparation is directly affected by loss of air and heat from the oven. Specifically, heated air lost from the oven must be replaced, and compensation for lost air even further aggravates the conditions described above. Additionally, air lost from dry ovens removes moisture from the oven which is compensated for by further evaporation of water from the food being processed and leads to even further deterioration of the food.

The prior art has further provided forced convection within a dry oven in an attempt to improve heat transfer. The use of forced convection fails to recognize the effects of equilibrium water activity and further accelerates drying of the food product during preparation.

Some other prior art arrangements have used steam to maintain a given humidity in the cooking chamber. However, such arrangements fail to realize that maintaining a designated relative humidity in the cooking chamber does not alleviate the aforenoted deficiencies. For example, if the relative humidity is maintained at a value above the equilibrium water activity of the food being processed then the food will gain moisture with the likelihood that the food product will become "soggy". Alternatively, if the humidity is maintained at a value much below the equilibrium water activity of the food, the above effects will be noted. Further, the maintenance of uniform relative humidity throughout the entire preparation cycle does not recognize the advantages realized by preparation of the food at conditions below, equal to, and above the equilibrium water activity of the food at various times during the processing cycle.

SUMMARY OF THE INVENTION

The present invention provides a new and useful method and apparatus for processing food as well as holding food after preparation.

More particularly, the present invention provides unexpected beneficial effects arising from interrelation of relating the temperature and moisture in a cooking chamber with the equilibrium water activity of the food in process. More particularly, the moisture in the chamber is adjusted by setting the temperature in a water reservoir communicating with the chamber and the air temperature within the chamber to provide desired water partial pressure in the chamber. It has been found that by selective adjustment of the air and water temperature during the processing cycle, the food can be caused to gain moisture, lose moisture or hold moisture as desired during different periods of the cycle, whereby, the final characteristics of the food can be adapted to provide desired results.

Additionally, the characteristics within the chamber can then be further adjusted so that the finished food can be held for a period of time without deterioration.

Apparatus and methods within the scope of the present invention can also provide preprogrammed food processing cycles where the air temperature and water vapor pressure within the preparation enclosure are adjusted at selectd times during the processing cycle to achieve the desired results. The occurrance of the adjustment of the vapor pressure and air temperature can be made to occur in response to a variety of conditions such as lapse of time. In another procedure, a thermometer is used to sense the temperature of the food in process and the processing steps are initiated in response to the temperature of the food being processed or a combination of processing time and food temperature.

Briefly, the present invention provides a method and apparatus for controlling the preparation of food product in an oven which includes a food preparation chamber. A first heat source is provided to heat the air in the chamber and a second heater is located in a water reservoir to establish the water vapor content in the chamber. The temperature of the air in the chamber and the temperature of the water in the reservoir are selected to maintain conditions in the chamber in selected relation with the equilibrium characteristics of the food product in preparation in the chamber. Different process steps and procedures can be provided in memory in the apparatus and selectively recalled for preparing food, and the conditions in the chamber can be adjusted during a oooking cycle to produce a food product with desired characteristics.

Examples of arrangements within the scope of the present invention are illustrated in the accompanying drawings and discussed hereinafter but it will be understood that neither the illustrations nor the descriptions are by way of limitation and that other arrangements also within the scope of the present invention will occur to those skilled in the art upon reading the disclosures set out hereinafter.

BRIEF DESCRIPTION OF THE DRAWINGS

Examples of arrangements within the scope of the present invention are illustrated by the accompanying drawings where.

DETAILED DESCRIPTION OF THE DRAWINGS

Figure 1:
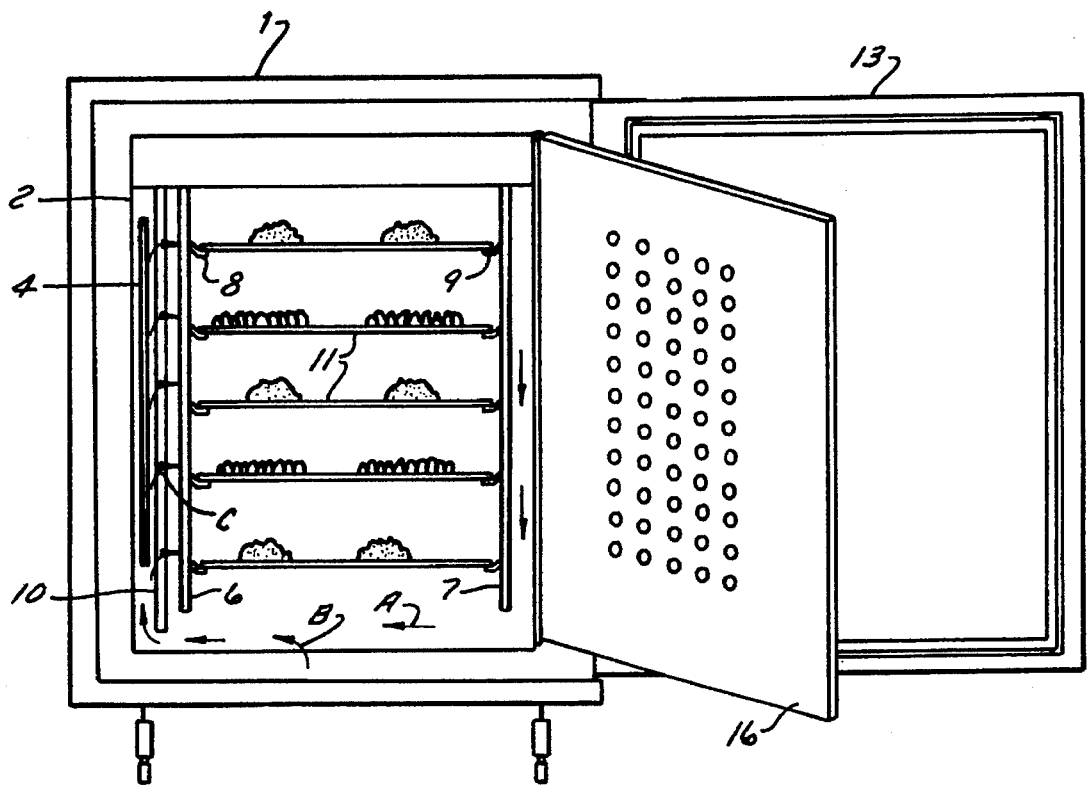
FIG. 1 is a front view of an example of an apparatus in accordance with the present invention.

FIG. 1 is a front elevational view of an example of an arrangement within the scope of the present invention. Briefly, a cabinet is provided which has been adapted to contain the equipment necessary to process food product in accordance with the present invention as described hereinafter with respect to FIGS. 2, 3, 4, and 6.

Figure 2:
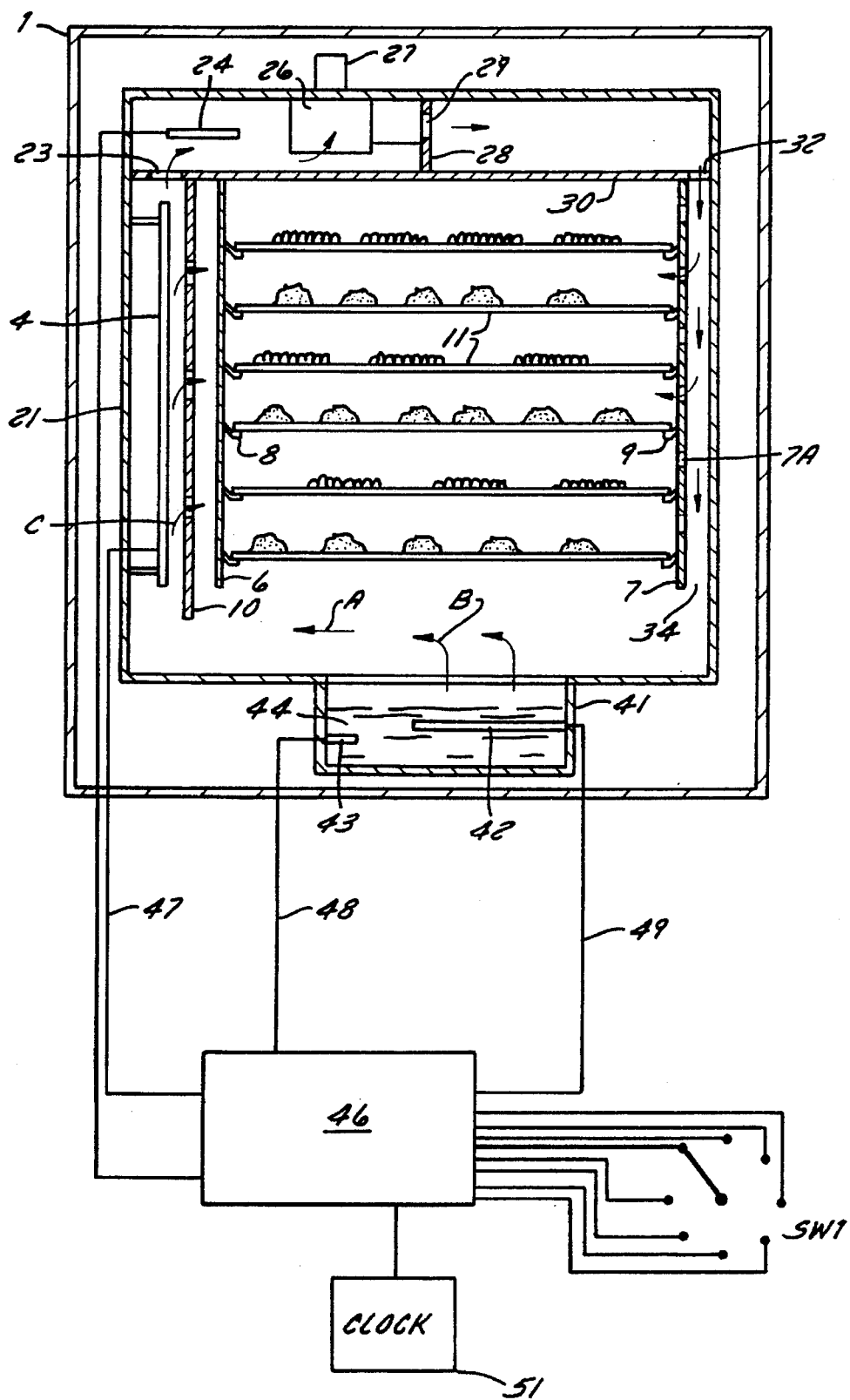
FIG. 2 presents an illustration showing an example of an apparatus for use in a method in accordance with the present invention.
Figure 3:
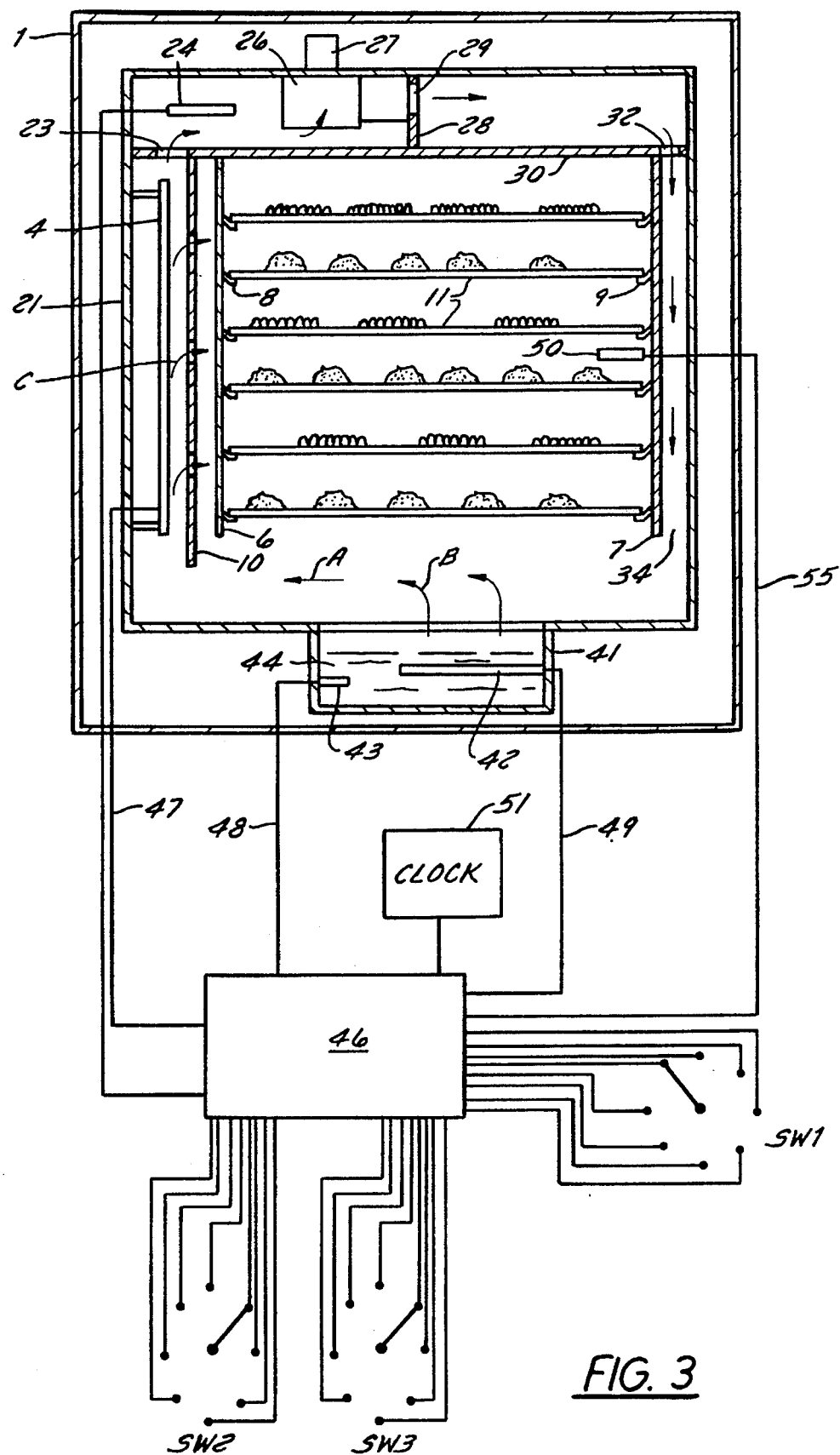
FIG. 3 presents an illustration showing an example of an apparatus for use in a method in accordance with the present invention.

In the arrangement shown in FIG. 1, a processing chamber 2 is defined within the enclosure 1. An air heater 4 is located as shown to heat the air in the enclosure but it will be understood tht the heater can be located wherever it will serve to heat air in the chamber. A perforated baffle 10 is provided and offset from the 4 so that the heater is located between one of the walls of the enclosure and baffle 10. As shown in FIGS. 2 and 3 baffle 10 can be perforated so that air stream C flows therethrough. Food to be processed is located on shelves 11 within the chamber. As shown, shelf 11 can be retained by clips 8 and 9 carried by downwardly extending walls 6 and 7.

Figure 6:
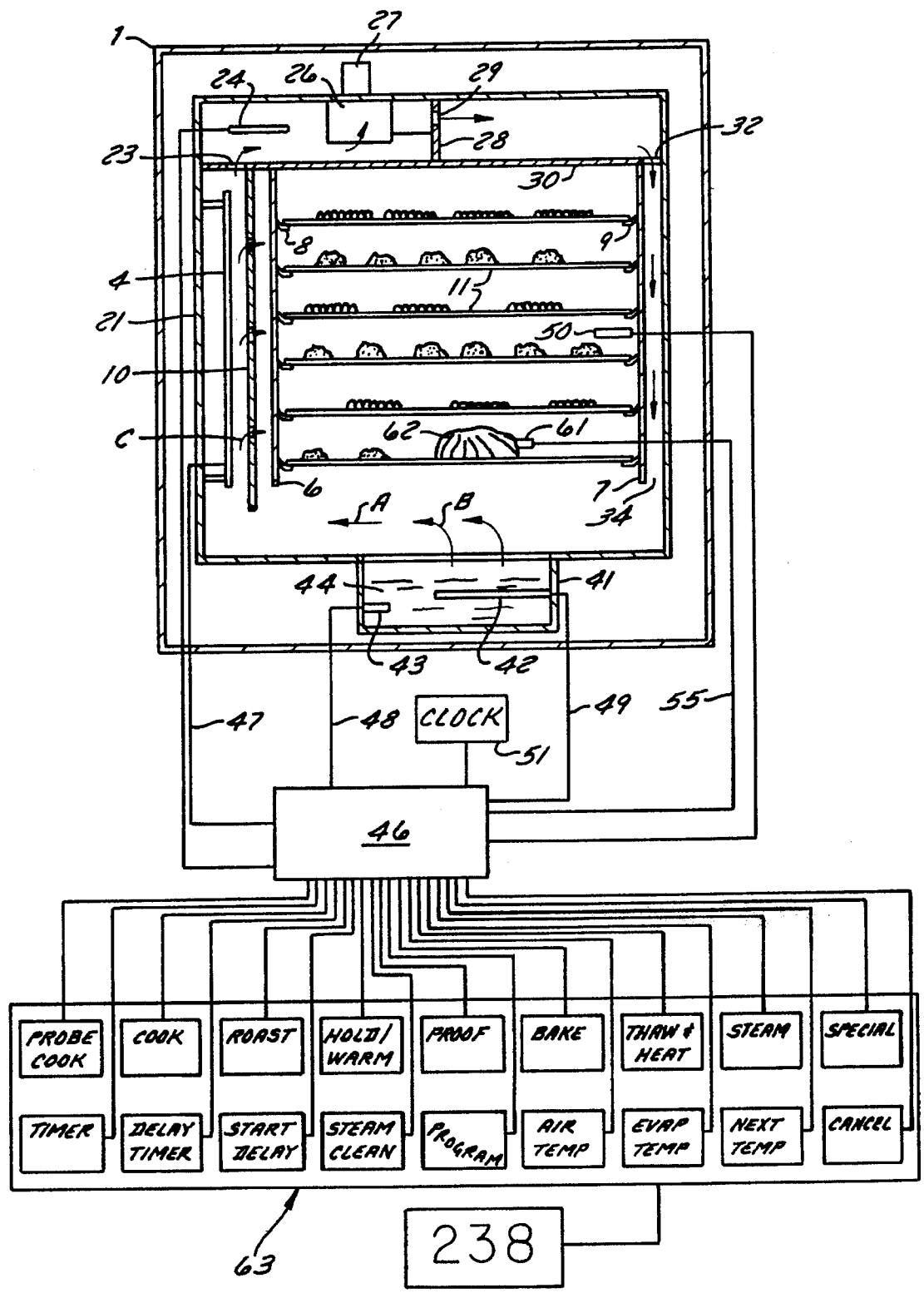

A water reservoir is located in the bottom of the enclosure and is shown in FIGS. 2, 3, and 6 and described with reference to those Figures. For the sake of clarity of overall orientation of the elements, the reservoir is not shown in FIG. 1. As described hereinafter with reference to FIGS. 2, 3, and 6, water vapor is emitted from the reservoir as shown by arrow B of FIG. 1 and admitted to chamber 2. The water vapor is carried across the bottom of chamber 2 by the air stream A circulated through the chamber by convection or by forced draft as described with reference to FIGS. 2, 3, and 6. In general, the air stream A is recycled to and from the food holding portion of chamber 2 at a selected rate necessary to maintain desired conditions within the chamber.

A door 13 is provided by the cabinet 1 to close chamber 2 against loss of heated air and water vapor so that equilibrium conditions can be maintained in the enclosure.

In accordance with one feature of the present invention an inner, perforated, door 16 can be provided. Door 16 has been found useful to deter rapid escape of high enthalpy air/water vapor from the chamber 2 when door 13 is opened. Because of the energy content (enthalpy) of the air/water vapor within the chamber it is possible that persons opening the door 13 could be injured by the rapidly escaping stream if the flow were not deterred by door 16.

FIG. 2 is a side crossectional view showing the enclosure 1 as previously described with reference to FIG. 1 and illustrating the heater 4 as well as the perforated baffle plate 10 and inner wall 21.

As previously referred to, air can be moved through the chamber by natural convection or by forced flow. FIGS. 2, 3 and 6 illustrate examples of arrangements to provide forced flow of air.

In this regard, FIG. 2 shows a plenum chamber defined by an upper panel 30 located within the enclosure 1. Apertures 23 and 32 are provided within the panel to allow introduction of air to the plenum and emission of air from the plenum as described hereinafter. A baffle 28 having an opening 29 is provided intermediate the ends of the plenum to divide the plenum. A fan 26 operated by a motor 27 has an inlet which draws air through the inlet for emission through the outlet 32 to chamber 2 by means of an opening 34 defined between supports 7 and wall 33 of enclosure 1. Cooperative perforations 7A can be provided in wall 7 for admission of air to the chamber.

A reservoir 41 is also shown in the arrangement shown in FIG. 2 and adapted to hold a supply of water 44. A heater 42 is located within the reservoir to establish selected water vapor above the reservoir and in the chamber 2 determined by the temperature of the water. The water vaporized in the reservoir is represented by the arrows A.

A temperature measuring device 43 such as a thermocouple, resistance temperature detector or thermistor is located within the reservoir 41 to generate a signal 48 which indicates the reservoir water temperture. Likewise, a similar temperature measuring device 24 is located in the plenum chamber to detect the temperature of the air emitted from heaters 4 and generate a signal 47 to indicate the temperature. In accordance with one feature of the present invention, the air and water temperatures are controlled to maintain selectively variable conditions within the chamber for processing food.

FIG. 2 illustrates that power can be supplied to water heater 42 and to air heater 4 by leads 49 and 47 respectively. In both cases the power supplied to the heaters is controlled by a controller 46 which receives the temperature signals 48 and 49 from the temperature measuring means in the air stream and reservoir. Controller 46 can be of the type commonly known including digital process controllers with memory capabilities. Controller 46 is adapted to selectivly control the power to heaters 4 and 43 to maintain desired air and water temperatures and particularly to maintain a selected water vapor pressure in the chamber relative to the equilibrium water activity of the food being processed.

As discussed hereinafter devices within the scope of the present invention can be adapted to provide several processing sequences and so a selector means SW1 is provided to illustrate the multiple cooking or processing sequences which can be provided. In one example, controller 46 can include memory where various processing algorithms are stored to provide different preparation cycles and the desired cycle is chosen by operation of switch SW1. In each cycle controller 46 operates heaters 4 and 43 to maintain desired relationship between air and water temperature and the equilibrium water activity of the food being processed throughout the cycle and to change the relationship at certain times during the cycle. As shown, controller 46 is provided with a clock 51 so that the relationship can be changed according to time. As discussed hereinafter with reference to FIG. 6, a temperature probe can be provided to measure selected temperatures within the enclosure, particularly the temperature of the food being processed so that the controller changes the relationship based on the temperture or degree of doneness of the food being processed.

Figure 5A:
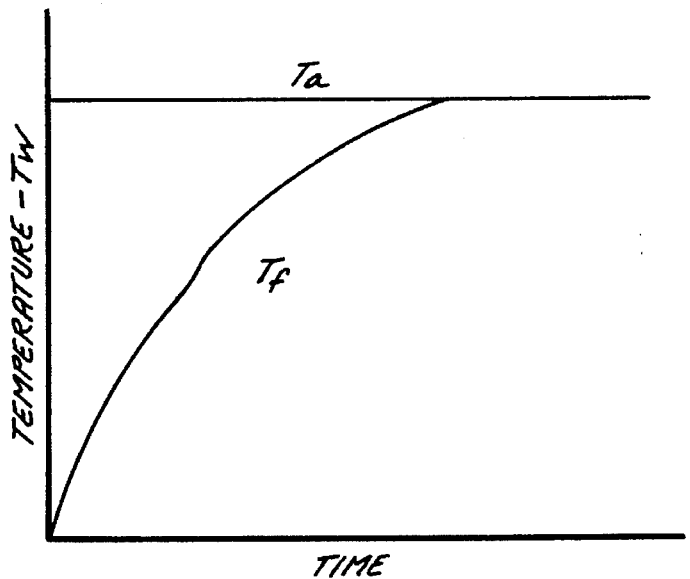
FIGS. 5A–5C are graphic illustrations of an example of a set of operating conditions within the scope of the present invention; and, FIG. 6 presents an illustration showing yet another example of an apparatus for use in a method in accordance with the present invention.
Figure 5B:
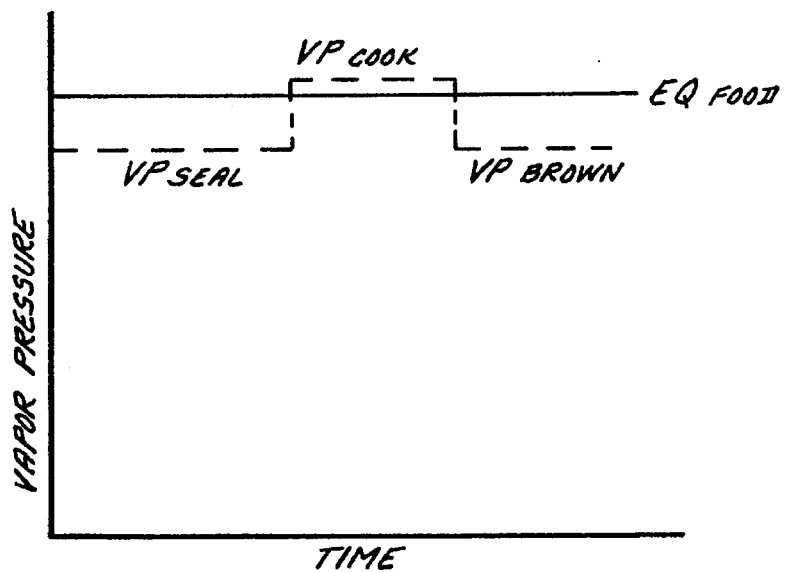
Figure 5C:
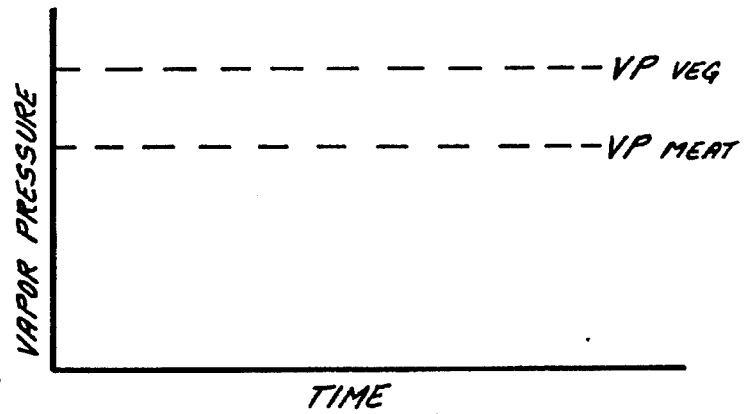

Specifically, the air and water temperatures can be controlled so that the water vapor content of the air in the chamber is equal to, greater than, or less than the equilibrium water activity of the food being processed as shown in FIGS. 5A–5C and discussed hereinafter so that the food moisture is constant, increases or decreases during that particular portion of the processing cycle.

The clock 51 allows the changes in conditions in the enclosure to occur according to programmed time/conditions algorithms to achieve desired characteristics of the food being prepared. Specifically, multiple levels or air and water temperature can be utilized, automatically if desired, for sequential change of conditions to; for example, thaw, proof, bake, cook, hold or otherwise process the food. It is now recognized that by taking advantage of the difference in enthalpy between devices within the scope of the present invention versus the enthalpy of ovens provided by the prior art significant advantages are unexpectedly provided.

For example the enthalpy of dry air at 280 degrees F. is 57 BTU/LB while the enthalpy of air saturated with water vapor at the same temperature is 1183 BTU/LB. The addition of water to the air makes a dramatic difference in available heat content. Thus, increased heat is available at lower temperature so the temperature in the oven can be lower than that required by "dry" ovens yet still process the food. Specifically, the conditions selected depend on the equilibrium water activity of the food being processed. Because the heat content of the air in devices in accordance with the present invention is higher than for prior art devices so lower air temperatures can be used. For example, potatoes have been processed in devices in accordance with the present invention in about 75% the time required for a "dry" oven and the product is 10%–20% greater in volume and weight, not to mention that the quality is better and total energy consumption is reduced by ⅔.

FIG. 3, like FIG. 2, shows another arrangement within the scope of the present invention. The principal difference between the arrangement of FIG. 2 and the example of FIG. 2 is that a vapor pressure detecting device 51 has been provided to generate a signal indicative of the vapor pressure of water in the chamber to add another control variable to the process.

Also in the example of FIG. 3, two sets of switches SW2 and SW3 are provided so that one set of conditions such as the processing sequence can be selected on switch SW2 while switch SW3 can be used for the selection of other conditions such as the cooking temperature to be maintained. Thus the vapor pressure can be established with respect to a base temperature, for example water temperature or air temperature, and the other varied to provide the desired processing conditions.

Figure 4:
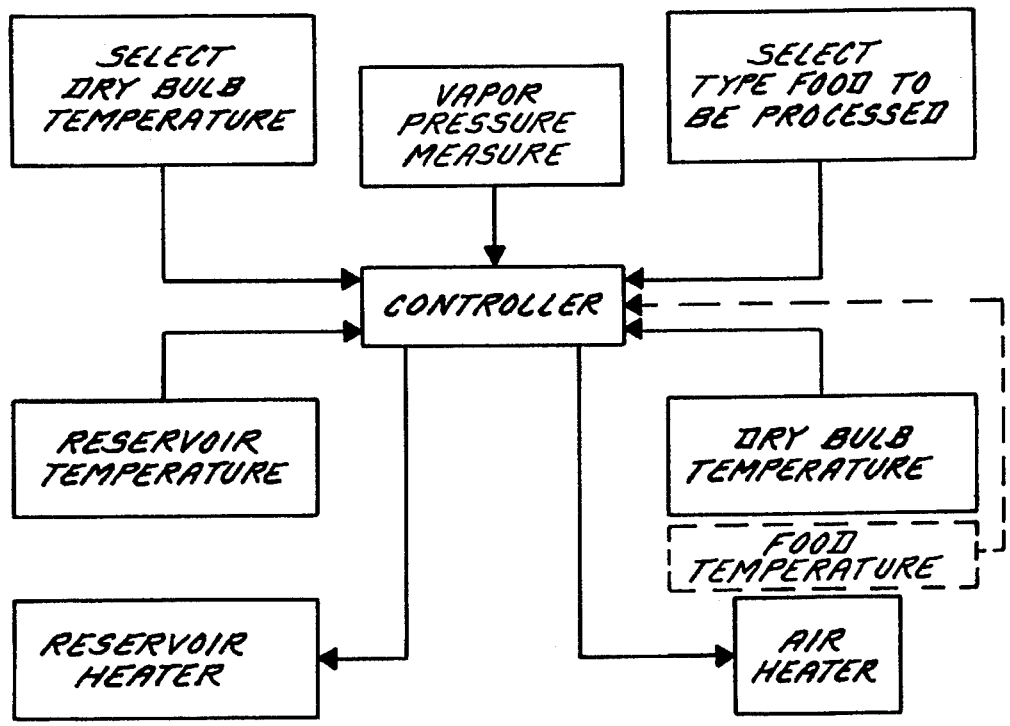
FIG. 4 is a flow chart of an example of a control arrangement within the scope of the present invention.

FIG. 4 is a schematic illustration of an example control procedure within the scope of the present invention using the arrangements of the type shown in FIG. 3. In FIG. 4 the dry bulb temperature, that is the air temperature in the chamber, can be selected. The type food to be processed can then be selected, and this establishes the water temperature to be maintained in the reservoir in order to establish the desired relationship between the vapor pressure in the chamber and the equilibrium water activity of the food being processed. Changes in the relationship can be made during the processing cycle to achieve the desired final food characteristics.

In systems of the type shown in FIG. 4, in operations where the air temperature is maintained constant, the controller reads the vapor pressure, the reservoir temperature, and, the air temperature and operates the reservoir heater and air heater to maintain the desired conditions in the chamber for preparation or storing of the food product.

FIG. 6 illustrates an arrangement similiar to the example in accordance with the present invention shown in FIG. 2 but where a temperature probe 61 is provided and located in the food 62. Probe 61 generates a signal 50 indicative of the temperature of the food and transmits the signal 50 to controller 46. In examples of the type shown in FIG. 6 the controller operates the heaters in response to the food, air and water temperatures instead of the processing time, air temperature, water temperature control provided by devices of the type shown in FIG. 2. As also shown in FIG. 6, A control panel 63 can be provided to visually select the processing cycles to be utilized and to field program controller 46 where desired. It will be noted that, for example, processing can be selected to operate in response to food temperature (PROBE COOK) and various processes ROAST, PROOF, BAKE, THAW AND HEAT STEAM or SPECIAL processing can be selected. Likewise, various process conditions such as CLEAN, PROGRAM, select AIR TEMP, select EVAP TEMP or NEXT TEMP can be selected. The foregoing is not an exhaustive list and other features and functions can be provided as needed.

Operation

Devices within the scope of the present invention can be operaed in numerous procedures. An example of an operating method is illustrated in 5A, 5B abd 5C but it will be understood that within the scope of the present invention other operating sequences can be utilized to accomplish different results.

One examplle of a temperature profile is shown in FIG. 5A where the food to be prepared is heated in the enclosure until a doneness temperture Tf at which the food is done. The air temperature Ta and water temperature Tw are controlled to cook the food to the doneness temperature. As previously discussed, the temperatures are varied during the processing to provide the desired final characteristics.

FIG. 5B illustrates the partial pressure of water in the enclosure as determined by the temperature of the water in the reservoir. In the example shown, the water temperature is initially set so that the partial pressure of the water vapor in the enclosure is lower than the equilibrium water activity of the food so that the surface of the food dries and the surface is sealed. This is ollowed by a period where the water temperature is incteased to increase the water vapor pressure above the equilibrium water activity of the food so that the enthalpy of the system increases, the food is cooked rapidly and does not loose moisture. That stage is followed by another cycle where the water temperature is lowered so the partial pressure of the water is decreased and the food is browned.

After the food is done, the water vapor pressure can be increased, in conjunction with a lowering of the air temperature if desired so that the partial pressure of the water and the equilibrium water activity of the food are approximately equal and the food is held at the correct temperature without gaining or losing moisture.

It will be recognized that the present invention provides methods and apparatus for the adjustment of conditions surrounding the food which allow the conditions surrounding food product to accomplish a variety of objectives unattainable with prior art devices and methods. By the methods proivided by the present invention the food is processed through a number of stages without ever removing it from the oven.

It will be understood that the foregoing are but a few examples of arrangements within the scope of the present invention and that other arrangements also within the scope of the present invention will occur to those skilled in the art upon reading the disclosure set forth hereinbefore.

The invention claimed is:

1. Method for controlling preparation of food in an oven which includes: a food preparation chamber; a water reservoir having a vapor space communicating with said food preparation chamber; air heater means to supply heat air in the food preparation chamber and water heater means to supply heat to the water in the reservoir; wherein the method comprises the steps of detecting the temperature of air in said chamber and temperature of water in said reservoir, generating a humidity signal in response thereto and operating said air and water heater means in response to said humidity signal to adjust the temperature of said air and the temperature of said water so that the partial pressure of water vapor in said chamber is maintained in selected relation with respect to the equilibrium vapor pressure of water in said food, whereby water is selectively added to or removed from said food.

2. The method of claim 1 wherein the temperature of at least one of said air and water temperatures is adjusted and the other is maintanined constant in response thereto.

3. The method of claim 1 including food temperature measurement means to measure the temperature of said food being processed and preparation control means to set the temperature of said water in said reservoir and the temperature of said air in said chamber so the partial vapor pressure of water in said chamber is maintained in selected relation to the equilibrium vapor pressure of water in said food.

4. The method of claim 3 wherein said food is processed to a selected temperature and thereafter is maintained at a selected temperature.

5. The method of claim 1 wherein said food temperature is selectively adjusted and a controller selectively adjusts said air and water temperatures to provide selected partial water vapor pressure in said chamber in response to the temperature of said food to establish selected relationships between the equilibrium partial pressure of said food and the partial presure of water in said chamber.

6. Apparatus for processing food including: enclosure means defining a food preparation chamber; heater means to selectively provide heat to maintain selected air temperature in said chamber; water reservoir means located in communication with said chamber so that water vapor from said reservoir is emitted to said chamber; water heater means located to heat water in said reservoir; temperaure measurement means to measure the temperature of water in said reservoir; vapor pressure measurement means to measure the partial vapor pressure of water in said chamber including the temperature of air in said chamber; vapor pressure signal generator means to generate a signal indicative of the partial vapor pressure of water in said chamber; controller means to receive said signal and operate said water heater heater means and said air heater means to maintain said partial water pressure in the chamber in selected relation to the equilibrium water pressure of said food.

7. The apparatus of claim 6 including fan means to provide air flow from said chamber over the surface of water in said reservoir.

8. The apparatus of claim 7 wherein said enclosure means includes door means to provide access to said chamber.

* * * * *